United States Patent

Wagner et al.

[11] Patent Number: 5,531,799
[45] Date of Patent: Jul. 2, 1996

[54] CERAMIC CORUNDUM ABRASIVE

[75] Inventors: Eckhard Wagner, Elmshorn; Günter Becker, Hamburg; Günter Bartels, Reinbek, all of Germany

[73] Assignee: Hermes Schleifmittel GmbH & Co, Hamburg, Germany

[21] Appl. No.: 234,222

[22] Filed: Apr. 28, 1994

[30] Foreign Application Priority Data

Apr. 30, 1993 [EP] European Pat. Off. .............. 93107085

[51] Int. Cl.$^6$ ....................................................... B24D 3/24
[52] U.S. Cl. ................................................. 51/309; 51/293
[58] Field of Search ............................ 51/293, 309, 307; 501/127, 153

[56] References Cited

U.S. PATENT DOCUMENTS

| | | | |
|---|---|---|---|
| 4,381,188 | 4/1983 | Waizer et al. | 51/309 |
| 4,381,925 | 5/1983 | Colleselli | 51/309 |
| 4,713,360 | 12/1987 | Newkirk et al. | 501/127 |
| 4,866,016 | 9/1989 | Ando et al. | 501/134 |
| 5,116,392 | 5/1992 | Selgrad et al. | 51/309 |
| 5,118,647 | 6/1992 | Newkirk et al. | 501/127 |
| 5,164,348 | 11/1992 | Wood | 51/309 |
| 5,194,073 | 3/1993 | Winter et al. | 51/309 |
| 5,306,677 | 4/1994 | Newkirk et al. | 501/127 |

FOREIGN PATENT DOCUMENTS

| | | | |
|---|---|---|---|
| 0158831 | 9/1985 | European Pat. Off. | C04B 35/71 |
| 0293163 | 11/1988 | European Pat. Off. | C04B 35/10 |
| 0396988 | 11/1990 | European Pat. Off. | C04B 20/10 |
| 1296367 | 5/1969 | Germany . | |
| 7707153 | 12/1978 | South Africa . | |

*Primary Examiner*—Deborah Jones
*Attorney, Agent, or Firm*—Chilton, Alix & Van Kirk

[57] ABSTRACT

An improved ceramic corundum abrasive is achieved by addition of tin. Preparation is preferably by the sol-gel process, with further modifying components such as magnesium, lithium, cobalt, yttrium, hafnium, iron, rare earths, gamma-aluminium oxide already being present in the sol.

18 Claims, No Drawings

CERAMIC CORUNDUM ABRASIVE

The invention relates to an abrasive of ceramic corundum, to a process for the preparation thereof and to tools manufactured therefrom.

Besides fused corundum, use is increasingly made of ceramic corundum which, because of its polycrystalline structure, shows advantageous wear behavior and which in the machining of special materials, for example of high-alloy stainless steels, makes possible a significant increase in tool life. A widespread process for preparing such ceramic corundum abrasives is the sol-gel process in which a sol containing a water-containing alumina, usually aluminium oxide hydrate, is converted into a gel by addition of acid. After drying, this is calcined, crushed and subsequently sintered. Particularly over the course of the past ten years, many attempts have been made to improve the quality of an abrasive obtained in such a way by particular process steps (EP-B 263 810) or by additions of material. The latter can, in accordance with their action in the sintering process, be classified on the one hand as nucleus formers (M. Kumagai and G. L. Messing: Controlled Transformation and Sintering of a Boehmite Sol-Gel by α-Alumina Seeding, J. Am. Ceram. Soc. 68 (9), 500–505 (1987)) or on the other hand as modifying components. The latter influence the sintering process, the structure and the properties of the end product in different ways. Modifying components used are, for example, magnesium, hafnium, cobalt, nickel, zinc (EP-B 0 024 099), yttrium (EP-B 228 856), iron oxide (EP-B 200 487), rare earths (EP-B 293 164), and lithium (EP-A-441 640). Although some of these additives do cause a significant improvement in the abrasive properties, the values are found to have a wide scatter which has the effect of reducing quality.

The invention starts out from the recognition that besides the physical material properties such as hardness, toughness, resistance to microcrack extension or micro-wear conventionally specified for corundum abrasives, significant importance for the achievement of an increased tool life has to additionally be attached to a high constancy of these values within a particle size fraction.

It is an object of the invention to prepare a corundum abrasive which, besides the usual quality features (in particular a high hardness) has only small quality variations within a batch of grain. It has surprisingly been found that this is achieved by the addition of tin.

Accordingly, an abrasive of the invention comprising mainly ceramic corundum is characterized by it having a tin content. This content should, calculated as tin oxide, lie above 0.01% by weight of the sintered end product. Furthermore, it preferably lies above 0.1% by weight. A content of 5% by weight, preferably 1% by weight, should not be exceeded.

Hardness and a fine grain can, as is known, be improved by the addition of magnesium. It has further proven to be very advantageous if the abrasive also contains lithium, whereby hardness and product uniformity are further improved. Finally, further modifying components such as cobalt, yttrium, hafnium, iron and/or rare earths can be used.

Optical examination of a micrograph of a fractured surface or etched surface of the product produced as in the examples given below can reveal a structure which is easily distinguishable from conventional products. Between conspicuously larger particles, some of which show a terrace structure typical of alpha-aluminum oxide (Petzold/Ulbricht: Alumina and alumina materials, p. 83, FIG. 7.14), there is an accumulation of smaller particles. The average size ratio is at least 3:1, but is generally greater than 5:1. Adjacent larger particles are largely, in most cases almost completely, separated from one another by a layer of the smaller particles. The layers of smaller particles form an essentially continuous matrix in which the larger particles are embedded. Accumulations of smaller particles which are present in the triangular interstices between the larger particles are at least connected to one another through branches over a wide area. Corresponding to the different appearance of the particles, there can be a different composition in which modifying components are present in particularly high concentration or in low concentration in morphologically distinguishable particles (crystallites) which clearly stand out from one another in a micrograph of the etched surface. In this context particles mean those shaped units which in the micrograph are distinguished from one another by distinct boundaries. In the literature they are also designated as crystallites.

The abrasive of the invention has, besides high hardness, unusually high resistance to, in particular, high thermal and mechanical loads so that, for example in the use of abrasive belts strewn with the abrasive of the invention, a significant increase in the tool life is achieved besides significantly increased abraded masses per time interval.

The abrasive of the invention can be used on substrates, as a component of bonded grinding tools or as loose abrasive, for example in abrasive blasting or lapping. In all application areas, any qualitative and quantitative combination with other abrasives can be used. Of particular advantage is mixing with abrasive grain of higher or particularly high hardness such as, for example, silicon carbide, cubic boron nitride or diamond. In addition, the abrasive of the invention can also function as a matrix into which one or more qualitatively different abrasives are incorporated. The latter is achieved, for example, by mixing the other abrasive into an intermediate, preferably the sol or gel, in the preparation of the abrasive of the invention.

In the preparation process, it is ensured that the material containing the tin is intimately mixed with and finely distributed in the other starting materials. If the preparation starts from pulverulent starting materials which are pressed with one another and then sintered, the material containing the tin is preferably likewise added in powder form. It can also be in liquid form and mixed into or sprayed onto the material to be sintered. Particularly intimate mixing is obtained when using the sol-gel process if the material containing the tin is added to the starting materials prior to formation of the gel so that it is already contained in the dispersion (sol) which leads to the gel. It can be present in solid, very finely divided milled form or in solution. It has been established that then even the dried gel has a significantly changed nature able to resist higher mechanical loads compared with the tin-free procedure. This not only infers a considerable modifying action, but also improves the crushing of the dried gel in respect of the yield and the shape of the crushed grains.

A particularly advantageous compound has proven to be tin oxide which is added in the form of pulverulent $SnO_2$ to the starting materials or to the intermediates. However, it is also possible to use other tin-containing materials, for example tin salts.

The sol advantageously contains very finely divided, optionally milled, gamma-aluminum oxide.

A particularly advantageous result is achieved by further addition of lithium which is preferably mixed into any intermediate stage as lithium salt dissolved in water. It is particularly advantageous for a lithium compound, preferably a lithium salt, to already be present in the sol in dissolved form. Furthermore, it is advantageous if any further modifying components, in particular those mentioned above, are already contained in the sol in finely divided solid or dissolved form. They can also be introduced into another intermediate. Advantageous amounts (as oxide) are:

| | |
|---|---|
| magnesium | 0.1–1% |
| yttrium | 0.1–1% |
| lithium | 0.01–5%, preferably 1.5–3% |
| cobalt | 0.01–0.4% |
| rare earths | 0.1–2% |

Apart from that, the process steps of the sol-gel process do not require any more detailed explanation because they can be taken from the generally available prior art, in particular from the abovementioned patent literature.

The starting material used is advantageously an aluminum hydroxide, preferably an aluminium oxide hydroxide of the boehmite type. For example, Disperal aluminas from Condea-Chemie, Brunsbüttel, have proven useful. After addition of demineralized water and nitric acid there is obtained a suspension which can, if desired, be centrifuged to remove coarse constituents. It is advantageous, but not strictly necessary, to add a nucleus former or gamma-aluminium oxide. The latter can first be present in an aqueous, nitric acid suspension which is likewise centrifuged. Mixing definite amounts of these suspensions and any further modifying components, preferably in aqueous solutions or suspensions, gives a suspension which is converted into a gel by means of nitric acid and/or salts thereof present in aqueous solution. This gel is dried and calcined. The dried or calcined intermediate is crushed and optionally classified. The calcined intermediate is sintered. Finally the abrasive thereby obtained is sieved and mixed to make batches of grain of uniform grain size.

It has been found that the use of lithium, optionally together with the components indicated further above, but without tin, also leads to very good results. This applies in particular to a lithium addition of the order (as oxide in the sintered product) of 2% by weight. Although the addition of lithium is known per se (EP 0 441 640), the amounts are only up to 1.5% by weight of the oxide in the sintered product. Larger amounts are supposed to cause a decline in the abrasive qualities. According to the invention, however, the opposite has been established. A product which is advantageous according to the invention therefore has, independently of the addition of tin, a lithium content (as oxide) of more than 1.5% by weight in the sintered product. However, the combined use of lithium and tin is particularly advantageous.

EXAMPLE 1

2000 kg of demineralized water (50° C.), 28 l of $NHO_3$ solution (53% srength) and 1000 kg of Disperal are mixed to form a suspension from which the precursor 1 is obtained after centrifugation. The solids content is about 30% by weight.

1000 kg of demineralized water (50° C.), 27 kg of gamma-$Al_2O_3$ ("Puralox 400" from Condea, Brunsbüttel) and 5 l of $HNO_3$ solution (53% strength) form the precursor 2 after centrifugation (solids content 2.5% by weight).

1000 kg of the precursor 1,500 kg of the precursor 2, 1 kg of tin oxide (as aqueous suspension), 3.3 kg of magnesium nitrate hexahydrate (in aqueous solution), 0.2 kg of cobalt nitrate hexahydrate (in aqueous solution) and 1 kg of yttrium oxide are mixed. This gives the precursor 3.

Precursor 4 contains 75 kg of demineralized water and 48 kg of aluminium nitrate nonahydrate.

Mixing 1505.5 kg of the precursor 3 with 123 kg of the precursor 4 leads to the formation of a gel which is dried at 130° C. for 20 minutes.

After crushing the dried material, it is calcined (850° C., 15 minutes). This is followed by sintering in a rotary tube furnace (1450° C., 12 minutes) and sieving and classification. The abrasive grain obtained in this way has a tin content (as tin oxide) of 0.36% by weight. It had an average hardness of 19.1 GPa.

EXAMPLE 2

The procedure of Example 1 is repeated using 5.5 kg of tin oxide in the precursor 3. The grain prepared had an average hardness of 18.1 GPa. The density was higher than in Example 1.

EXAMPLE 3

The procedure of Example 1 is repeated, additionally using 25.4 kg of lithium nitrate. The grain obtained had a lithium content (as lithium oxide) of 2%. It had an average Knoop hardness of 22.22 GPa.

EXAMPLES 4 TO 10

Method and material composition as in Example 3, but the proportion of lithium nitrate is varied in such a way that the lithium oxide content in the end product is

| | |
|---|---|
| 0.1% by weight | (Example 4) |
| 0.2% by weight | (Example 5) |
| 0.3% by weight | (Example 6) |
| 0.4% by weight | (Example 7) |
| 0.5% by weight | (Example 8) |
| 1.0% by weight | (Example 9) |
| 3.0% by weight | (Example 10). |

The measurement of the hardness (Knoop method) was carried out using a testing apparatus manufactured by Shimadzu, model HMV-2000.

| | average Knoop hardness [GPa] |
|---|---|
| Example 4 | 18.9 |
| Example 5 | 20.3 |
| Example 6 | 20.5 |
| Example 7 | 20.5 |
| Example 8 | 20.6 |
| Example 9 | 20.7 |
| Example 10 | 19.7 |

EXAMPLE 11

The procedure of Example 3 was used to produce the abrasive of the invention on an industrial scale, two samples of the abrasive grain being taken from the ongoing production at times 60 minutes apart.

10 abrasive grains of each sample were subjected to hardness measurement with the following results (Knoop GPa).

| Sample 1: |
|---|
| 22.22 |
| 21.21 |
| 20.57 |
| 21.88 |
| 21.88 |
| 20.72 |
| 21.88 |

-continued

|        |       |
|--------|-------|
|        | 21.04 |
|        | 21.88 |
|        | 22.22 |
| $m_\lambda =$ | 21.55 |

Sample 2:

|        |       |
|--------|-------|
|        | 22.22 |
|        | 23.70 |
|        | 20.88 |
|        | 22.58 |
|        | 22.22 |
|        | 21.54 |
|        | 20.41 |
|        | 20.72 |
|        | 21.04 |
|        | 21.04 |
| $m_\lambda =$ | 21.64 |

EXAMPLE 12

To assess the performance of the abrasive of the invention vulcanized fibre grinding wheels were made using the abrasive grain of grain size P 36 prepared in accordance with Examples 1 and 3.

As comparative sample, use was made of vulcanized fibre grinding wheels made in the same way and containing fused corundum (Comparative sample A).

The diameter of the wheels was uniformly 180 mm (cross recess design, rotation rate 6000 $min^{-1}$). The workpiece ground was a steel pipe ST 37, diameter 195 mm, which had a rotation of 16.3 $min^{-1}$ counter to the grinding wheel. The numerical values in each case give the abraded mass in [g] achieved in a time interval of 60 s.

| Abraded mass in [g] Abrasive used | 0s–60s | 60s–120s | 120s–180s | 180s–240s |
|---|---|---|---|---|
| Abrasive grain corresponding to Example 3 | 65 | 47 | 39 | 35 |
| Abrasive grain corresponding to Example 1 | 52 | 35 | 27 | 23 |
| Comparative sample A | 32 | 17 | 12 | 9 |

EXAMPLE 13

For a further comparative test, abrasive belts of dimensions 50 mm×2000 mm were made using fused corundum (Comparative sample B), abrasive corresponding to Example 1 and abrasive corresponding to Example 3.

The workpiece ground was a steel pipe ST 35-8/I having a diameter of 219.1 mm and a wall thickness of 6.3 mm, which rotated at a speed of 33.4 $min^{-1}$. The linear speed of the abrasive belt was 38 m/s.

The numerical values refer to the total abraded mass in [kg] achieved up to the respective point in time.

| Abrasive used | 5 min | 10 min | 15 min | 20 min | 25 min | 30 min | 35 min | 40 min | 45 min |
|---|---|---|---|---|---|---|---|---|---|
| Comparative sample B | 0.91 | 1.46 | 1.93 | 2.35 | 2.75 | 2.98 | 3.16 | 3.29 | 3.44 |
| Example 1: | 0.95 | 1.67 | 2.29 | 2.85 | 3.28 | 3.73 | 4.12 | 4.45 | 4.71 |
| Example 3: | 1.29 | 2.27 | 3.18 | 4.01 | 4.80 | 5.57 | 6.26 | 6.87 | 7.42 |

EXAMPLE 14

As in Example 3, but without the addition of tin. A grain having a hardness of 19.1 GPa results.

We claim:

1. In a sintered abrasive material based on ceramic corundum of polycrystalline structure obtained by the sol gel process, the improvement wherein the polycrystalline structure contains therein at least 0.01% by weight of tin calculated as tin oxide.

2. The abrasive material of claim 1 wherein the tin content does not exceed 5% by weight.

3. The abrasive material of claim 1 wherein the material includes about 0.1–1.0% by weight magnesium calculated as the oxide thereof.

4. The abrasive material of claim 1 wherein the material includes about 0.01–5.0% by weight lithium calculated as the oxide thereof.

5. The abrasive material of claim 1 wherein the material includes one or more modifying components selected from the group consisting of cobalt, yttrium, hafnium, iron and rare earths.

6. The abrasive material of claim 1 wherein the polycrystalline structure comprises two particle fractions of significantly different size, said fractions having an average dimensional ratio of at least about 3:1.

7. The abrasive material of claim 6 wherein the tin is present in the smaller particle fraction in a greater proportion than in the larger particle fraction.

8. The abrasive material of claim 6 wherein the smaller particle fraction has a submicron average size.

9. In a grinding tool wherein the abrasive material thereof comprises at least 5% by weight of a ceramic corundum of polycrystalline structure obtained by the sol gel process, the improvement wherein said polycrystalline structure contains therein at least 0.01% by weight of tin calculated as tin oxide.

10. The grinding tool of claim 9 wherein the abrasive material thereof contains one or more abrasives selected from the group consisting of diamond, cubic boron nitride and silicon carbide.

11. In a method of making an abrasive material comprising the steps of a) preparing a sol containing an alumina source material, b) gelling the sol to form a gel thereof, c) drying the gel, d) crushing the dried gel, and e) sintering the crushed material, the improvement comprising the step of adding to step a) a sufficient amount of a tin-containing material such that the resultant sintered material contains at least 0.01% by weight tin calculated as tin oxide.

12. The method of claim 11 wherein the tin-containing material is dissolved in the sol or is present as a finely divided solid.

13. The method of claim 11 wherein the alumina source material in the sintered material contains gamma-aluminum oxide.

14. The method of claim 11 wherein a lithium-containing material is dissolved in the sol or is present as a finely divided solid.

15. The method of claim 11 wherein a magnesium-containing material is dissolved in the sol or is present as a finely divided solid.

16. The method of claim 11 wherein step e) is carried out for about 1–20 minutes at about 1100° C.–1600° C.

17. In a sintered abrasive material based on ceramic corundum of polycrystalline structure obtained by the sol gel process, the improvement wherein the polycrystalline structure contains therein at least 2.0% by weight of lithium calculated as lithium oxide.

18. In a grinding tool wherein the abrasive material thereof comprises at least 5% by weight of a ceramic corundum of polycrystalline structure obtained by the sol gel process, the improvement wherein said polycrystalline structure contains therein at least 2.0% by weight of lithium calculated as lithium oxide.

* * * * *